(12) United States Patent
Goenka (10) Patent No.: US 9,863,672 B2
(45) Date of Patent: Jan. 9, 2018

(54) THERMOELECTRIC-BASED AIR CONDITIONING SYSTEM

(71) Applicant: Gentherm Incorporated, Northville, MI (US)

(72) Inventor: Lakhi Nandlal Goenka, Ann Arbor, MI (US)

(73) Assignee: GENTHERM INCORPORATED, Northville, MI (US)

( * ) Notice: Subject to any disclaimer, the term of this patent is extended or adjusted under 35 U.S.C. 154(b) by 279 days.

(21) Appl. No.: 14/576,986

(22) Filed: Dec. 19, 2014

(65) Prior Publication Data

US 2015/0176872 A1      Jun. 25, 2015

Related U.S. Application Data

(63) Continuation of application No. 13/852,821, filed on Mar. 28, 2013, now Pat. No. 8,915,091, which is a continuation of application No. 12/825,272, filed on Jun. 28, 2010, now Pat. No. 8,408,012, which is a continuation of application No. 11/101,871, filed on Apr. 8, 2005, now Pat. No. 7,743,614.

(51) Int. Cl.

| | |
|---|---|
| *F25B 21/02* | (2006.01) |
| *F25B 21/04* | (2006.01) |
| *B60H 1/00* | (2006.01) |
| *B60H 1/22* | (2006.01) |
| *B23P 15/26* | (2006.01) |
| *F25B 27/02* | (2006.01) |

(52) U.S. Cl.
CPC .............. *F25B 21/04* (2013.01); *B23P 15/26* (2013.01); *B60H 1/00478* (2013.01); *B60H 1/2221* (2013.01); *B60H 2001/2275* (2013.01); *F25B 27/02* (2013.01); *F25B 2321/0252* (2013.01); *Y10T 29/49002* (2015.01)

(58) Field of Classification Search
CPC ..... F25B 21/02; H01L 35/30; B60H 1/00478; B60H 1/00371
USPC ....... 62/3.3, 3.61, 3.7, 115, 239, 259.2, 430, 62/3.2; 165/42, 43, 59, 61, 201, 202
See application file for complete search history.

(56) References Cited

U.S. PATENT DOCUMENTS

| | | |
|---|---|---|
| 413,136 A | 10/1889 | Dewey |
| 2,118,636 A | 5/1938 | Alexander et al. |

(Continued)

FOREIGN PATENT DOCUMENTS

| | | |
|---|---|---|
| CN | 1094500 | 11/1994 |
| CN | 1158655 | 9/1997 |

(Continued)

OTHER PUBLICATIONS

U.S. Appl. No. 15/177,836, filed Jun. 9, 2016, Gawthrop.

(Continued)

*Primary Examiner* — Melvin Jones
(74) *Attorney, Agent, or Firm* — Knobbe, Martens, Olson & Bear, LLP (57) ABSTRACT

Disclosed is an air conditioning system that operates in a heating mode, a cooling mode or a demisting mode. In some embodiments, the system includes a first circuit for circulating a first medium therein, a second circuit for circulating the first medium or a second medium therein and a thermoelectric module having a first surface in thermal contact with the first medium.

20 Claims, 4 Drawing Sheets

(56) References Cited

U.S. PATENT DOCUMENTS

| | | | |
|---|---|---|---|
| 2,362,259 A | 11/1944 | Findley | |
| 2,363,168 A | 11/1944 | Findley | |
| 2,499,901 A | 3/1950 | Brown, Jr. | |
| 2,912,832 A | 11/1959 | Clark | |
| 2,944,404 A | 7/1960 | Fritts | |
| 2,949,014 A | 8/1960 | Belton, Jr. et al. | |
| 2,984,077 A | 5/1961 | Gaskill | |
| 2,997,514 A | 8/1961 | Roeder, Jr. | |
| 3,040,538 A | 6/1962 | Alsing | |
| 3,085,405 A | 4/1963 | Frantti | |
| 3,125,860 A | 3/1964 | Reich | |
| 3,136,577 A | 6/1964 | Richard | |
| 3,137,142 A | 6/1964 | Venema | |
| 3,138,934 A | 6/1964 | Roane | |
| 3,196,620 A | 7/1965 | Elfving et al. | |
| 3,212,275 A | 10/1965 | Tillman, Jr. | |
| 3,213,630 A | 10/1965 | Mole | |
| 3,236,056 A | 2/1966 | Phillips et al. | |
| 3,252,504 A | 5/1966 | Newton | |
| 3,391,727 A | 7/1968 | Topouszian | |
| 3,527,621 A | 9/1970 | Newton | |
| 3,561,224 A | 2/1971 | Hampden et al. | |
| 3,599,437 A | 8/1971 | Panas | |
| 3,635,037 A | 1/1972 | Hubert | |
| 3,681,929 A | 8/1972 | Schering | |
| 3,779,307 A | 12/1973 | Weiss et al. | |
| 3,817,043 A | 6/1974 | Zoleta | |
| 3,885,126 A | 5/1975 | Sugiyama et al. | |
| 4,038,831 A | 8/1977 | Gaudel et al. | |
| 4,051,691 A | 10/1977 | Dawkins | |
| 4,065,936 A | 1/1978 | Fenton et al. | |
| 4,193,271 A | 3/1980 | Honigsbaum | |
| 4,229,687 A | 10/1980 | Newman | |
| 4,280,330 A | 7/1981 | Harris et al. | |
| 4,314,008 A | 2/1982 | Blake | |
| 4,324,845 A | 4/1982 | Stockel | |
| 4,402,188 A | 9/1983 | Skala | |
| 4,444,851 A | 4/1984 | Maru | |
| 4,448,157 A | 5/1984 | Eckstein et al. | |
| 4,459,466 A * | 7/1984 | Nakagawa | G05D 23/2401 |
| | | | 165/103 |
| 4,494,380 A | 1/1985 | Cross | |
| 4,531,379 A | 7/1985 | Diefenthaler, Jr. | |
| 4,565,072 A | 1/1986 | Fujiwara et al. | |
| 4,570,450 A | 2/1986 | Takemi et al. | |
| 4,572,430 A | 2/1986 | Takagi et al. | |
| 4,637,220 A | 1/1987 | Sakano | |
| 4,658,599 A | 4/1987 | Kajiwara | |
| 4,665,707 A | 5/1987 | Hamilton | |
| 4,665,971 A | 5/1987 | Sakurai | |
| 4,707,995 A | 11/1987 | Assaf | |
| 4,753,682 A | 6/1988 | Cantoni | |
| 4,823,554 A | 4/1989 | Trachtenberg et al. | |
| 4,848,090 A | 7/1989 | Peters | |
| 4,858,069 A | 8/1989 | Hughes | |
| 4,865,929 A | 9/1989 | Eck | |
| 4,905,475 A | 3/1990 | Tuomi | |
| 4,907,060 A | 3/1990 | Nelson et al. | |
| 4,922,721 A | 5/1990 | Robertson et al. | |
| 4,922,998 A | 5/1990 | Carr | |
| 4,923,248 A | 5/1990 | Feher | |
| 4,947,735 A | 8/1990 | Guillemin | |
| 4,988,847 A | 1/1991 | Argos et al. | |
| 4,999,576 A | 3/1991 | Levinson | |
| 5,015,545 A | 5/1991 | Brooks | |
| 5,029,446 A | 7/1991 | Suzuki | |
| 5,038,569 A | 8/1991 | Shirota et al. | |
| 5,042,566 A | 8/1991 | Hildebrand | |
| 5,071,652 A | 12/1991 | Jones et al. | |
| 5,092,129 A | 3/1992 | Bayes et al. | |
| 5,097,829 A | 3/1992 | Quisenberry | |
| 5,099,654 A | 3/1992 | Baruschke et al. | |
| 5,111,664 A | 5/1992 | Yang | |
| 5,119,640 A | 6/1992 | Conrad | |
| 5,121,047 A | 6/1992 | Goedken et al. | |
| 5,138,851 A | 8/1992 | Mardikian | |
| 5,141,826 A | 8/1992 | Bohm et al. | |
| 5,167,129 A | 12/1992 | Akasaka | |
| 5,193,347 A | 3/1993 | Apisdorf | |
| 5,197,291 A | 3/1993 | Levinson | |
| 5,198,930 A | 3/1993 | Muratomi | |
| 5,229,702 A | 7/1993 | Boehling | |
| 5,232,516 A | 8/1993 | Hed | |
| 5,269,146 A | 12/1993 | Kerner | |
| 5,279,459 A * | 1/1994 | Single, II | B60H 1/00842 |
| | | | 219/202 |
| 5,291,960 A | 3/1994 | Brandenburg et al. | |
| 5,300,197 A | 4/1994 | Mitani et al. | |
| 5,303,771 A | 4/1994 | Des Champs | |
| 5,316,078 A | 5/1994 | Cesaroni | |
| 5,385,020 A | 1/1995 | Gwilliam et al. | |
| 5,386,823 A | 2/1995 | Chen | |
| 5,395,708 A | 3/1995 | Hall | |
| 5,407,130 A | 4/1995 | Uyeki et al. | |
| 5,419,980 A | 5/1995 | Okamoto et al. | |
| 5,431,021 A | 7/1995 | Gwilliam et al. | |
| 5,448,891 A | 9/1995 | Nakagiri et al. | |
| 5,450,894 A | 9/1995 | Inoue et al. | |
| 5,483,807 A | 1/1996 | Abersfelder et al. | |
| 5,497,625 A | 3/1996 | Manz et al. | |
| 5,499,504 A | 3/1996 | Mill et al. | |
| 5,549,153 A | 8/1996 | Wilhelm et al. | |
| 5,576,512 A | 11/1996 | Doke | |
| 5,592,363 A | 1/1997 | Atarashi et al. | |
| 5,605,047 A | 2/1997 | Park et al. | |
| 5,623,195 A | 4/1997 | Bullock et al. | |
| 5,626,021 A | 5/1997 | Karunasiri et al. | |
| 5,653,111 A | 8/1997 | Attey et al. | |
| 5,673,964 A | 10/1997 | Roan et al. | |
| 5,694,770 A | 12/1997 | Bruck et al. | |
| 5,705,770 A | 1/1998 | Ogassawara et al. | |
| 5,715,695 A | 2/1998 | Lord | |
| 5,722,249 A | 3/1998 | Miller, Jr. | |
| 5,724,818 A | 3/1998 | Iwata et al. | |
| 5,725,048 A | 3/1998 | Burk et al. | |
| 5,740,681 A | 4/1998 | Karl | |
| 5,802,856 A | 9/1998 | Schaper et al. | |
| 5,816,236 A | 10/1998 | Moroi et al. | |
| 5,871,859 A | 2/1999 | Parise | |
| 5,878,589 A | 3/1999 | Tanaka et al. | |
| 5,878,950 A | 3/1999 | Faccone et al. | |
| 5,890,371 A | 4/1999 | Rajasubramanian et al. | |
| 5,899,086 A | 5/1999 | Noda et al. | |
| 5,901,572 A | 5/1999 | Peiffer et al. | |
| RE36,242 E | 6/1999 | Apisdorf | |
| 5,910,159 A | 6/1999 | Matsuo et al. | |
| 5,918,930 A | 7/1999 | Kawai et al. | |
| 5,921,088 A | 7/1999 | Imaizumi et al. | |
| 5,921,314 A | 7/1999 | Schuller et al. | |
| 5,955,772 A | 9/1999 | Shakouri et al. | |
| 5,964,092 A | 10/1999 | Tozuka et al. | |
| 5,966,941 A | 10/1999 | Ghoshal | |
| 5,975,856 A | 11/1999 | Welle | |
| 5,977,785 A | 11/1999 | Burward-Hoy | |
| 5,987,890 A | 11/1999 | Chiu et al. | |
| 6,002,105 A | 12/1999 | Tamada | |
| 6,016,662 A | 1/2000 | Tanaka et al. | |
| 6,050,326 A | 4/2000 | Evans | |
| 6,057,050 A | 5/2000 | Parise | |
| 6,059,198 A | 5/2000 | Moroi et al. | |
| 6,082,445 A | 7/2000 | Dugan | |
| 6,084,172 A | 7/2000 | Kishi et al. | |
| 6,094,919 A * | 8/2000 | Bhatia | H01L 23/38 |
| | | | 165/104.21 |
| 6,105,659 A | 8/2000 | Pocol et al. | |
| 6,119,463 A | 9/2000 | Bell | |
| 6,138,466 A | 10/2000 | Lake et al. | |
| 6,138,749 A | 10/2000 | Kawai et al. | |
| 6,158,225 A | 12/2000 | Muto et al. | |
| 6,205,802 B1 | 3/2001 | Drucker et al. | |
| 6,205,805 B1 | 3/2001 | Takahashi et al. | |
| 6,213,198 B1 | 4/2001 | Shikata et al. | |
| 6,223,539 B1 | 5/2001 | Bell | |
| 6,247,530 B1 | 6/2001 | Mochizuki et al. | |

(56) References Cited

U.S. PATENT DOCUMENTS

| | | |
|---|---|---|
| 6,254,179 B1 | 7/2001 | Kortum et al. |
| 6,270,015 B1 | 8/2001 | Hirota |
| 6,282,907 B1 | 9/2001 | Ghoshal |
| 6,293,107 B1 | 9/2001 | Kitagawa |
| 6,294,721 B1 | 9/2001 | Oravetz et al. |
| 6,324,860 B1 | 12/2001 | Maeda et al. |
| 6,334,311 B1 | 1/2002 | Kim et al. |
| 6,346,668 B1 | 2/2002 | McGrew |
| 6,347,521 B1 | 2/2002 | Kadotani et al. |
| 6,366,832 B2 | 4/2002 | Lomonaco et al. |
| 6,393,842 B2 | 5/2002 | Kim |
| 6,401,462 B1 | 6/2002 | Bielinski |
| 6,407,435 B1 | 6/2002 | Ma et al. |
| 6,412,287 B1 | 7/2002 | Hughes et al. |
| 6,431,257 B1 | 8/2002 | Sano et al. |
| 6,435,273 B1 | 8/2002 | Futernik |
| 6,438,964 B1 | 8/2002 | Giblin |
| 6,453,993 B1 | 9/2002 | Bujak, Jr. |
| 6,455,186 B1 | 9/2002 | Moores, Jr. et al. |
| 6,457,324 B2 | 10/2002 | Zeigler et al. |
| 6,464,027 B1 | 10/2002 | Dage et al. |
| 6,474,073 B1 | 11/2002 | Uetsuji et al. |
| 6,474,081 B1 | 11/2002 | Feuerecker |
| 6,481,213 B2 | 11/2002 | Carr et al. |
| 6,505,886 B2 | 1/2003 | Gielda et al. |
| 6,510,696 B2 | 1/2003 | Guttman et al. |
| 6,530,231 B1 | 3/2003 | Nagy et al. |
| 6,530,842 B1 | 3/2003 | Wells et al. |
| 6,530,920 B1 | 3/2003 | Whitcroft et al. |
| 6,539,725 B2 | 4/2003 | Bell |
| 6,539,729 B2 | 4/2003 | Tupis et al. |
| 6,560,968 B2 | 5/2003 | Ko |
| 6,568,205 B2 | 5/2003 | Bureau et al. |
| 6,569,550 B2 | 5/2003 | Khelifa |
| 6,570,362 B1 | 5/2003 | Estes et al. |
| RE38,128 E | 6/2003 | Gallup et al. |
| 6,588,217 B2 | 7/2003 | Ghoshal |
| 6,598,403 B1 | 7/2003 | Ghoshal |
| 6,598,405 B2 | 7/2003 | Bell |
| 6,606,877 B2 | 8/2003 | Tomita et al. |
| 6,607,142 B1 | 8/2003 | Boggs et al. |
| 6,640,889 B1 | 11/2003 | Harte et al. |
| 6,645,666 B1 | 11/2003 | Moores, Jr. et al. |
| 6,653,002 B1 | 11/2003 | Parise |
| 6,682,844 B2 | 1/2004 | Gene |
| 6,700,052 B2 | 3/2004 | Bell |
| 6,705,089 B2 | 3/2004 | Chu et al. |
| 6,722,139 B2 | 4/2004 | Moon et al. |
| 6,732,534 B2 | 5/2004 | Spry |
| 6,767,666 B2 | 7/2004 | Nemoto |
| 6,779,348 B2 | 8/2004 | Taban |
| 6,793,016 B2 | 9/2004 | Aoki et al. |
| 6,672,076 B2 | 10/2004 | Bell |
| 6,807,811 B2 | 10/2004 | Lee |
| 6,862,892 B1 | 3/2005 | Meyer et al. |
| 6,883,602 B2 | 4/2005 | Drucker |
| 6,886,356 B2 | 5/2005 | Kubo et al. |
| 6,894,369 B2 | 5/2005 | Irino et al. |
| 6,896,047 B2 | 5/2005 | Currle et al. |
| 6,907,739 B2 | 6/2005 | Bell |
| 6,910,345 B2 | 6/2005 | Horstmann et al. |
| 6,915,641 B2 | 7/2005 | Harvie |
| 6,949,309 B2 | 9/2005 | Moores, Jr. et al. |
| 6,959,555 B2 | 11/2005 | Bell |
| 6,962,195 B2 | 11/2005 | Smith et al. |
| 6,973,799 B2 | 12/2005 | Kuehl et al. |
| 6,986,247 B1 | 1/2006 | Parise |
| 7,007,491 B2 | 3/2006 | Grimm et al. |
| 7,014,945 B2 | 3/2006 | Moores, Jr. et al. |
| 7,056,616 B2 | 6/2006 | Moores, Jr. et al. |
| 7,061,208 B2 | 6/2006 | Nishihata et al. |
| 7,063,139 B2 | 6/2006 | Horn et al. |
| 7,074,122 B2 | 7/2006 | Haupt et al. |
| 7,089,756 B2 | 8/2006 | Hu |
| 7,111,465 B2 | 9/2006 | Bell |
| 7,134,288 B2 | 11/2006 | Crippen et al. |
| 7,171,955 B2 | 2/2007 | Perkins |
| 7,230,404 B2 | 6/2007 | Kimoto et al. |
| 7,231,772 B2 | 6/2007 | Bell |
| 7,240,725 B2 | 7/2007 | Horn et al. |
| 7,246,496 B2 | 7/2007 | Goenka et al. |
| 7,252,904 B2 | 8/2007 | Moores, Jr. et al. |
| 7,264,046 B1 | 9/2007 | Futernik et al. |
| 7,270,910 B2 | 9/2007 | Yahnker et al. |
| 7,290,400 B2 | 11/2007 | Heberle et al. |
| 7,310,953 B2 | 12/2007 | Pham et al. |
| 7,326,490 B2 | 2/2008 | Moores, Jr. et al. |
| 7,350,368 B2 | 4/2008 | Heberle et al. |
| 7,363,766 B2 | 4/2008 | Eisenhour |
| 7,380,586 B2 | 6/2008 | Gawthrop |
| 7,384,704 B2 | 6/2008 | Davis |
| 7,416,138 B2 | 8/2008 | Ellison et al. |
| 7,426,835 B2 | 9/2008 | Bell |
| 7,530,390 B2 | 5/2009 | Feuerecker et al. |
| 7,531,270 B2 | 5/2009 | Buck et al. |
| 7,578,341 B2 | 8/2009 | Ichishi et al. |
| 7,581,584 B2 | 9/2009 | Yoneno et al. |
| 7,587,902 B2 | 9/2009 | Bell |
| 7,650,757 B2 | 1/2010 | Bhatti |
| 7,743,614 B2 | 6/2010 | Goenka et al. |
| 7,765,824 B2 | 8/2010 | Wong et al. |
| 7,779,639 B2 | 8/2010 | Goenka |
| 7,784,289 B2 | 8/2010 | Scherer et al. |
| 7,788,933 B2 | 9/2010 | Goenka |
| 7,828,050 B2 | 11/2010 | Esaki |
| 7,863,866 B2 | 1/2011 | Wolf |
| 7,870,892 B2 | 1/2011 | Gawthrop |
| 7,905,278 B2 | 3/2011 | Sato et al. |
| 7,926,293 B2 | 4/2011 | Bell |
| 7,942,010 B2 | 5/2011 | Bell |
| 7,946,120 B2 | 5/2011 | Bell |
| 7,950,735 B2 | 5/2011 | Major et al. |
| 8,015,835 B2 | 9/2011 | Lee et al. |
| 8,039,726 B2 | 10/2011 | Zhang et al. |
| 8,069,674 B2 | 12/2011 | Bell |
| 8,079,223 B2 | 12/2011 | Bell |
| 8,082,752 B2 | 12/2011 | Liu et al. |
| 8,104,294 B2 | 1/2012 | Reeve |
| 8,136,874 B2 | 3/2012 | Negrini et al. |
| 8,261,868 B2 | 9/2012 | Goenka et al. |
| 8,359,871 B2 | 1/2013 | Woods et al. |
| 8,408,012 B2 | 4/2013 | Goenka et al. |
| 8,490,412 B2 | 7/2013 | Bell et al. |
| 8,495,884 B2 | 7/2013 | Bell et al. |
| 8,613,200 B2 | 12/2013 | LaGrandeur et al. |
| 8,631,659 B2 | 1/2014 | Goenka |
| 8,640,466 B2 | 2/2014 | Bell et al. |
| 8,678,492 B2 | 3/2014 | Benton |
| 8,733,126 B2 | 5/2014 | Sekiya et al. |
| 8,784,166 B2 | 7/2014 | Mazzocco et al. |
| 8,806,882 B2 | 8/2014 | Bennion et al. |
| 8,839,632 B2 | 9/2014 | Coenka et al. |
| 8,841,015 B2 | 9/2014 | Yoon |
| 8,915,091 B2 | 12/2014 | Goenka |
| 9,447,994 B2 | 9/2016 | Barnhart et al. |
| 9,555,686 B2 | 1/2017 | Ranalli et al. |
| 2002/0095943 A1 | 7/2002 | Hatakeyama et al. |
| 2002/0173264 A1 | 11/2002 | Ottman et al. |
| 2003/0029175 A1 | 2/2003 | Lee |
| 2003/0084935 A1 | 5/2003 | Bell |
| 2003/0140636 A1 | 7/2003 | Van Winkle |
| 2003/0145605 A1 | 8/2003 | Moon et al. |
| 2003/0217738 A1 | 11/2003 | Ryon |
| 2004/0025516 A1 | 2/2004 | Van Winkle |
| 2004/0045594 A1 | 3/2004 | Hightower |
| 2004/0050076 A1 | 3/2004 | Palfy et al. |
| 2004/0055312 A1 | 3/2004 | Bell |
| 2004/0093889 A1 | 5/2004 | Bureau et al. |
| 2004/0098991 A1 | 5/2004 | Heyes |
| 2004/0237541 A1 | 12/2004 | Murphy |
| 2005/0000473 A1 | 1/2005 | Ap et al. |
| 2005/0011199 A1 | 1/2005 | Grisham et al. |
| 2005/0061497 A1 | 3/2005 | Amaral |
| 2005/0067862 A1 | 3/2005 | Iqbal et al. |

(56) References Cited

U.S. PATENT DOCUMENTS

| | | |
|---|---|---|
| 2005/0081834 A1 | 4/2005 | Perkins |
| 2005/0087333 A1 | 4/2005 | Horn et al. |
| 2005/0133206 A1 | 6/2005 | Scott |
| 2005/0139692 A1 | 6/2005 | Yamamoto |
| 2005/0178128 A1 | 8/2005 | Harwood et al. |
| 2005/0204768 A1 | 9/2005 | Di Vito et al. |
| 2005/0229629 A1 | 10/2005 | Burk et al. |
| 2005/0247446 A1 | 11/2005 | Gawthrop |
| 2005/0257531 A1 | 11/2005 | Kadle et al. |
| 2005/0257545 A1 | 11/2005 | Ziehr et al. |
| 2005/0268621 A1 | 12/2005 | Kadle et al. |
| 2005/0278863 A1 | 12/2005 | Bahash et al. |
| 2006/0000592 A1 | 1/2006 | Bosquet et al. |
| 2006/0005548 A1 | 1/2006 | Ruckstuhl |
| 2006/0011152 A1 | 1/2006 | Hayes |
| 2006/0028182 A1 | 2/2006 | Yang et al. |
| 2006/0059933 A1 | 3/2006 | Axakov et al. |
| 2006/0060236 A1 | 3/2006 | Kim |
| 2006/0075758 A1 | 4/2006 | Rice et al. |
| 2006/0102335 A1 | 5/2006 | Fujiki et al. |
| 2006/0124165 A1 | 6/2006 | Bierschenk et al. |
| 2006/0130490 A1 | 6/2006 | Petrovski |
| 2006/0137358 A1 | 6/2006 | Feher |
| 2006/0137853 A1 | 6/2006 | Haller et al. |
| 2006/0150657 A1 | 7/2006 | Spurgeon et al. |
| 2006/0174633 A1 | 8/2006 | Beckley |
| 2006/0188418 A1 | 8/2006 | Yoon et al. |
| 2006/0225441 A1 | 10/2006 | Goenka et al. |
| 2006/0254284 A1 | 11/2006 | Ito et al. |
| 2006/0254285 A1 | 11/2006 | Lin |
| 2007/0000255 A1 | 1/2007 | Elliot et al. |
| 2007/0017666 A1 | 1/2007 | Goenka et al. |
| 2007/0033951 A1 | 2/2007 | Goenka et al. |
| 2007/0056295 A1 | 3/2007 | De Vilbiss |
| 2007/0214799 A1 | 9/2007 | Goenka |
| 2007/0272290 A1 | 11/2007 | Sims et al. |
| 2008/0017362 A1 | 1/2008 | Kwon et al. |
| 2008/0028768 A1 | 2/2008 | Goenka |
| 2008/0028769 A1 | 2/2008 | Goenka |
| 2008/0223064 A1 | 9/2008 | Feuerecker et al. |
| 2008/0230618 A1 | 9/2008 | Gawthrop |
| 2008/0239675 A1 | 10/2008 | Speier |
| 2008/0250794 A1 | 10/2008 | Bell |
| 2008/0307796 A1 | 12/2008 | Bell et al. |
| 2008/0311466 A1 | 12/2008 | Yang et al. |
| 2009/0000310 A1 | 1/2009 | Bell et al. |
| 2009/0007572 A1 | 1/2009 | Bell et al. |
| 2009/0025770 A1 | 1/2009 | Lofy |
| 2009/0118869 A1 | 5/2009 | Cauchy et al. |
| 2010/0031987 A1 | 2/2010 | Bell et al. |
| 2010/0052374 A1 | 3/2010 | Bell et al. |
| 2010/0101238 A1 | 4/2010 | LaGrandeur et al. |
| 2010/0101239 A1 | 4/2010 | LaGrandeur et al. |
| 2010/0112419 A1 | 5/2010 | Jang et al. |
| 2010/0155018 A1 | 6/2010 | Goenka et al. |
| 2010/0287952 A1 | 11/2010 | Goenka |
| 2010/0291414 A1 | 11/2010 | Bell et al. |
| 2010/0293966 A1 | 11/2010 | Yokomachi et al. |
| 2010/0313576 A1 | 12/2010 | Goenka |
| 2011/0079023 A1 | 4/2011 | Goenka et al. |
| 2011/0107773 A1 | 5/2011 | Gawthrop |
| 2011/0120146 A1 | 5/2011 | Ota et al. |
| 2011/0139397 A1 | 6/2011 | Haussmann |
| 2011/0164652 A1 | 7/2011 | ReFalo et al. |
| 2011/0236731 A1 | 9/2011 | Bell et al. |
| 2011/0244300 A1 | 10/2011 | Closek et al. |
| 2011/0284202 A1 | 11/2011 | Hirai et al. |
| 2012/0202413 A1 | 8/2012 | Kawashima |
| 2012/0266608 A1 | 10/2012 | Kadle et al. |
| 2012/0285758 A1 | 11/2012 | Bell et al. |
| 2013/0059190 A1 | 3/2013 | Kossakovski et al. |
| 2013/0174579 A1 | 7/2013 | Goenka et al. |
| 2013/0183566 A1 | 7/2013 | Wayne et al. |
| 2013/0192271 A1 | 8/2013 | Ranalli et al. |
| 2013/0192272 A1 | 8/2013 | Ranalli et al. |
| 2013/0206382 A1 | 8/2013 | Ichishi et al. |
| 2013/0216887 A1 | 8/2013 | Wayne et al. |
| 2013/0299128 A1 | 11/2013 | Bergamini |
| 2013/0317728 A1 | 11/2013 | Hall et al. |
| 2013/0327063 A1 | 12/2013 | Gawthrop |
| 2014/0060086 A1 | 3/2014 | Ranalli et al. |
| 2014/0213168 A1 | 7/2014 | Goenka et al. |
| 2014/0325997 A1 | 11/2014 | Bell et al. |
| 2014/0338882 A1 | 11/2014 | Rollinson et al. |
| 2015/0298524 A1 | 10/2015 | Goenka |
| 2016/0355067 A1 | 12/2016 | Barnhart et al. |
| 2016/0361967 A1 | 12/2016 | Gawthrop |
| 2016/0361968 A1 | 12/2016 | Bell et al. |

FOREIGN PATENT DOCUMENTS

| | | |
|---|---|---|
| CN | 1195090 | 10/1998 |
| CN | 1236429 A | 11/1999 |
| CN | 2813357 | 9/2006 |
| CN | 2827781 | 10/2006 |
| CN | 101508236 A | 8/2009 |
| CN | 101720414 | 6/2010 |
| CN | 102328569 | 1/2012 |
| CN | 202174959 | 3/2012 |
| CN | 202200804 | 4/2012 |
| CN | 102555870 | 7/2012 |
| CN | 103438629 | 12/2013 |
| CN | 104334380 | 10/2016 |
| DE | 13 01 454 | 8/1969 |
| DE | 2 220 009 | 11/1973 |
| DE | 23 19 155 | 10/1974 |
| DE | 2319155 | 10/1974 |
| DE | 43 29 816 | 3/1994 |
| DE | 42 38 364 | 5/1994 |
| DE | 196 45 544 | 5/1998 |
| DE | 197 30 678 | 1/1999 |
| DE | 299 04 238 | 6/1999 |
| DE | 198 29 440 | 1/2000 |
| DE | 199 51 224 | 5/2001 |
| DE | 20 105 487 | 10/2001 |
| DE | 102 37 420 | 9/2003 |
| DE | 103 37 889 | 12/2004 |
| DE | 20 2005 013 039 | 11/2005 |
| DE | 10 2009 003 737 | 12/2012 |
| EP | 0 206 151 | 12/1986 |
| EP | 0 389 407 | 9/1990 |
| EP | 0 418 995 | 3/1991 |
| EP | 0 545 021 | 6/1993 |
| EP | 0 791 497 | 8/1997 |
| EP | 0 834 421 | 4/1998 |
| EP | 1 038 701 | 9/2000 |
| EP | 1 462 281 | 9/2004 |
| EP | 1 088 696 | 11/2005 |
| EP | 1641067 A1 | 3/2006 |
| EP | 1 932 695 A1 | 6/2008 |
| EP | 2 349 753 | 11/2016 |
| FR | 2 419 479 A | 10/1979 |
| FR | 2806666 | 9/2001 |
| FR | 2903057 | 1/2008 |
| FR | 2 907 064 | 4/2008 |
| GB | 231 192 A | 5/1926 |
| GB | 1 040 485 | 8/1966 |
| GB | 2 267 338 | 12/1993 |
| GB | 2 278 432 | 11/1994 |
| GB | 2 333 352 | 7/1999 |
| GB | 2 440 312 | 1/2008 |
| JP | 39-27735 | 12/1964 |
| JP | 56-18231 | 2/1981 |
| JP | 62-191212 | 8/1987 |
| JP | 01 131830 A | 5/1989 |
| JP | 01 200122 | 8/1989 |
| JP | 01 281344 | 11/1989 |
| JP | 04 103925 | 4/1992 |
| JP | 4-165234 | 6/1992 |
| JP | 05-37521 | 5/1993 |
| JP | 05-037521 U | 5/1993 |
| JP | 05-278451 | 10/1993 |
| JP | 6-024235 | 2/1994 |
| JP | 06-135218 | 5/1994 |

(56) References Cited

FOREIGN PATENT DOCUMENTS

| | | |
|---|---|---|
| JP | 07-089334 | 4/1995 |
| JP | 07-54189 | 6/1995 |
| JP | 07-253224 | 10/1995 |
| JP | 08-316388 | 11/1996 |
| JP | 09042801 | 2/1997 |
| JP | 09-092761 | 4/1997 |
| JP | 09-254630 | 9/1997 |
| JP | 9-276076 | 10/1997 |
| JP | 10035268 | 2/1998 |
| JP | 11-042933 | 2/1999 |
| JP | 11-129735 | 5/1999 |
| JP | 11-301254 | 11/1999 |
| JP | 11-342731 | 12/1999 |
| JP | 2000-130883 | 5/2000 |
| JP | 2000-142095 | 5/2000 |
| JP | 2000-161721 | 6/2000 |
| JP | 2000-185542 | 7/2000 |
| JP | 2000-274788 | 10/2000 |
| JP | 2000-274871 | 10/2000 |
| JP | 2000-274874 | 10/2000 |
| JP | 2000-318434 | 11/2000 |
| JP | 2000-335230 | 12/2000 |
| JP | 2001-206053 | 7/2001 |
| JP | 2001 267566 | 9/2001 |
| JP | 2001 304778 | 10/2001 |
| JP | 2002-013758 | 1/2002 |
| JP | 2002 059736 A | 2/2002 |
| JP | 2002-232028 A | 8/2002 |
| JP | 2003-237357 | 8/2003 |
| JP | 2004 050874 | 2/2004 |
| JP | 2005 212564 | 8/2005 |
| JP | 2005-302851 | 10/2005 |
| JP | 2006-001530 | 1/2006 |
| JP | 2006 015965 | 1/2006 |
| JP | 2007-161110 | 6/2007 |
| JP | 2008 047371 | 2/2008 |
| JP | 2008-094366 | 4/2008 |
| JP | 2008-108509 | 5/2008 |
| JP | 2008-226617 | 9/2008 |
| JP | 2009-245730 | 10/2009 |
| JP | 2011-001048 | 1/2011 |
| JP | 2011-131871 | 7/2011 |
| JP | 2011-152855 | 8/2011 |
| KR | 1997-0000845 | 1/1997 |
| KR | 1998-0022458 | 7/1998 |
| KR | 1998-0040187 | 9/1998 |
| KR | 10-0189462 | 6/1999 |
| KR | 2001 111646 | 12/2001 |
| KR | 10 2002 0057600 B1 | 7/2002 |
| KR | 10-2003-0082589 | 10/2003 |
| KR | 10-0503239 | 7/2005 |
| KR | 2008-0008875 | 1/2008 |
| KR | 10 2011 0013876 A | 2/2011 |
| KR | 2011-0011230 | 12/2011 |
| KR | 2012-0041861 | 5/2012 |
| KR | 2012-0088042 | 8/2012 |
| LU | 66619 | 2/1973 |
| SE | 337 227 | 5/1971 |
| SU | 184886 A | 7/1966 |
| SU | 1196627 A | 12/1985 |
| WO | WO 94/020801 | 9/1994 |
| WO | WO 95/01500 | 1/1995 |
| WO | WO 95/014899 | 6/1995 |
| WO | WO 96/05475 | 2/1996 |
| WO | WO 97/47930 | 12/1997 |
| WO | WO 99/09360 | 2/1999 |
| WO | WO 99/10191 | 3/1999 |
| WO | WO 99/58907 | 11/1999 |
| WO | WO 00/12948 | 3/2000 |
| WO | WO 02/000458 | 1/2002 |
| WO | WO 03/014634 | 2/2003 |
| WO | WO 2004/027328 | 4/2004 |
| WO | WO 05/023571 | 3/2005 |
| WO | WO 2005/023571 | 3/2005 |
| WO | WO 05/063567 | 7/2005 |
| WO | WO 06/037178 | 4/2006 |
| WO | WO 06/064432 | 6/2006 |
| WO | WO 07/001289 | 1/2007 |
| WO | WO 07/002891 | 1/2007 |
| WO | WO 2007/001289 | 1/2007 |
| WO | WO 2007/021273 | 2/2007 |
| WO | WO 2008/013946 | 1/2008 |
| WO | WO 08/147305 | 4/2008 |
| WO | WO 2008/072251 | 6/2008 |
| WO | WO 2008/091293 | 7/2008 |
| WO | WO 2008/123663 | 10/2008 |
| WO | WO 2008/147305 | 12/2008 |
| WO | WO 2008/148042 | 12/2008 |
| WO | WO 2010/008158 | 1/2010 |
| WO | WO 2010/048575 | 4/2010 |
| WO | WO 2010/135363 | 11/2010 |
| WO | WO 2013/009759 | 1/2013 |
| WO | WO 2013/151903 | 10/2013 |
| WO | WO 2014/065702 | 5/2014 |
| WO | WO 2014/110524 | 7/2014 |
| WO | WO 2014/120688 | 8/2014 |
| WO | WO 2016/100697 | 6/2016 |
| WO | WO 2017/065847 | 4/2017 |

OTHER PUBLICATIONS

U.S. Appl. No. 15/177,878, filed Jun. 9, 2016, Bell et al.
U.S. Appl. No. 15/240,900, filed Aug. 18, 2016, Barnhart et al.
Diller, R. W., et al.: "Experimental results confirming improved performance of systems using thermal isolation" Thermoelectrics, 2002. Proceedings ICT '02. Twenty-First International Conference on Aug. 25-29, 2002, Piscataway, NJ USA, IEEE, Aug. 25, 2002 (Aug. 25, 2002), pp. 548-550, XP010637541 ISBN: 0-7803-7683-8.
Japanese Office Action re JP Patent Application No. 2006-305938, dated Jul. 21, 2009.
BEHR, "Li-ion Battery Cooling", Power Point Presentation, Stuttgart, May 20, 2009, 13 pages.
BEHR, "Thermal Management for Hybrid Vehicles", Power Point Presentation, Technical Press Day 2009, 20 pages.
Chinese First Office Action for CN Appl. No. 201080032250.3, dated Nov. 26, 2013.
Esfahanian, Vahid et al., "Design and Simulation of Air Cooled Battery Thermal Management System Using Thermoelectric for a Hybrid Electric Bus", Proceedings of the FISITA 2012 World Automotive Congress, vol. 3, Lecture notes in Electrical Engineering, vol. 191, 2013.
Heckenberger, Thomas, "Li-on Battery Cooling," BEHR Power Point Presentation, Technical Press Day, Stuttgart, May 20, 2009, 13 pages.
Horie, et al., "A Study on an Advanced Lithium-ion Battery System for EVs", The World Electric Vehicle Journal, 2008, vol. 2, Issue 2, pp. 25-31.
Jeon, et al., "Development of Battery Pack Design for High Power Li-Ion Battery Pack of HEV", The World Electric Vehicle Association Journal, 2007, vol. 1, pp. 94-99.
Jeon, et al., "Thermal modeling of cylindrical lithium ion battery during discharge cycle," Energy Conversion and Management, Aug. 2011, vol. 52, Issues 8-9, pp. 2973-2981.
Lofy, John et al., "Thermoelectrics for Environmental Control Automobiles," 21st International Conference on Thermoelectronics, 2002, p. 471-476.
Morawietz, et al., "Thermoelektrische Modellierung eines Lithium-Lonen-Energiespeichers fuer den Fahrzeugeinsatz," VDI—Berichte, Nov. 2008, Issue 2030, pp. 299-318.
Sabbath et al., "Passive Thermal Management System for Plug-in Hybrid and Comparison with Active Cooling: Limitation of Temperature Rise and Uniformity of Termperature Distribution," ECS Transactions, 13 (19) 41-52 (2008), The Electrochemical Society.
Stockholm, John G.: "Large-Scale Cooling: Integrated Thermoelectric Element Technology," CRC Handbook of Thermoelectrics, Chapter 53, pp. 657-666. 0-8493-0146, Jul. 1995.
Bell, L.E., "Alternate Thermoelectric Thermodynamic Cycles with Improved Power Generation Efficiencies" Thermoelectrics, 2003 Twenty-Second International Conference on—ICT LA Grande (56) References Cited

OTHER PUBLICATIONS

Motte, France Aug. 17-21, 2003, Piscataway, NJ, USA, IEEE, Aug. 17, 2003 (Aug. 17, 2003), pp. 558~562, XP010697375, ISBN: 0-7803-8301-X.

* cited by examiner

THERMOELECTRIC-BASED AIR CONDITIONING SYSTEM

RELATED APPLICATION

This application is a continuation of U.S. application Ser. No. 13/852,821, filed Mar. 28, 2013, titled THERMOELECTRIC-BASED THERMAL MANAGEMENT SYSTEM, which is a continuation of U.S. application Ser. No. 12/825,272, filed Jun. 28, 2010, now U.S. Pat. No. 8,408,012, issued Apr. 2, 2013, titled THERMOELECTRIC-BASED HEATING AND COOLING SYSTEM, which is a continuation of U.S. application Ser. No. 11/101,871, filed Apr. 8, 2005, now U.S. Pat. No. 7,743,614, issued Jun. 29, 2010, titled THERMOELECTRIC-BASED HEATING AND COOLING SYSTEM, the entire contents of which are incorporated by reference herein and made a part of this specification.

BACKGROUND

Field

This disclosure generally relates to heating, ventilation and air conditioning ("HVAC") systems for a vehicle, and more particularly to HVAC systems having thermoelectric modules for providing heating and cooling to a passenger compartment of the vehicle.

Description of Related Art

In a conventional vehicle, such as an automobile, the heating of the passenger compartment is accomplished by running engine coolant, typically a mix of water and glycol, through a heat exchanger and then blowing air through the heat exchanger and into the passenger compartment. The drawback with this is that the heat exchanger will not provide heat until the engine has caused the coolant to warm up. In colder climates, the time to warm up the coolant can be lengthy, thereby delaying warming of passengers of the automobile.

Furthermore, newer engines and powertrain arrangements are being developed where the engine does not produce as much excess heat for the coolant to absorb. Some examples include direct injection engines and hybrid powertrains. For these types of engines and powertrains, the temperature of the coolant can take a very long time to rise to a level that will allow for adequate heating of the passenger compartment when using a conventional heating system.

Therefore, it is desired to provide a HVAC system that provides heat to the passenger compartment of the vehicle more quickly than a conventional system.

BRIEF SUMMARY

In overcoming the drawbacks and limitations of the known technologies, a system of heating and cooling the passenger compartment of an automobile is disclosed. The heating and cooling system includes a first circuit and a second circuit. The first circuit includes a first pump for circulating a first medium therethrough, a first heat exchanger and a third heat exchanger. The second circuit includes a second pump for circulating a second medium therethrough, a second heat exchanger and a fourth heat exchanger. Additionally, the system includes a thermoelectric module having a first surface in thermal contact with the first heat exchanger and a second surface in thermal contact with the second heat exchanger.

The system operates in a heating mode, a cooling mode and a demisting mode. In the heating mode, an electrical current is passed through the thermoelectric module so that the second side of the thermoelectric module warms the second medium through the second heat exchanger. An engine, which is operatively engaged with the first circuit, warms the first medium. As the first and second mediums are warmed, the first and second pumps circulate the mediums through the third and fourth heat exchangers respectively.

The third and fourth heat exchangers are located near a blower. Generally, the third heat exchanger is located between the blower and the fourth heat exchanger such that blower will move air through the third heat exchanger before moving air through the fourth heat exchanger. After the air passes through the third and fourth heat exchangers, the air enters the passenger compartment of the automobile.

In the cooling mode, an electrical current is passed through the thermoelectric module so that the second side of the thermoelectric module cools the second medium through the second heat exchanger. The second pump circulates the cooler second medium through the fourth heat exchanger. In this mode, the first medium is directed through the second bypass line by the second double switching valve. By utilizing the second bypass line, the heated first medium is either reduced or not directed through the third heat exchanger. The air passing through the third heat exchanger will not be heated or will be heated by a reduced amount, while the air passing through the fourth heat exchanger will be cooled.

In the demisting mode, the air provided by the blower is first cooled before it is heated and/or passed to the passenger compartment. By initially cooling the air, moisture can be removed from the air via condensation. One way to accomplish this is through the addition of another heat exchanger placed between the blower and the third heat exchanger. Through the use of bypass lines and double switching valves, the cooled second medium will be directed to the heat exchanger placed between the blower and the third heat exchanger. The air provided by the blower will first be cooled by the heat exchanger placed between the blower and the third heat exchanger before the air is heated by the third heat exchanger. Alternatively, the third heat exchanger 32 may be split into multiple portions, such that some portions may heat and other portions may cool.

Another way of accomplishing demisting is through the addition of multiple bypass lines and double switching valves. The bypass lines and double switching valves will direct the first medium to the fourth heat exchanger and will direct the second medium to the third heat exchanger. By directing the cooler second medium to the third heat exchanger and the warmer first medium to the fourth heat exchanger, the air provided by the blower will first be cooled by the third heat exchanger before it is warmed by the fourth heat exchanger. Other alternative fluid paths and other heat exchanger configurations may also be utilized.

These and other advantages, features and embodiments of the invention will become apparent from the drawings, detailed description and claims which follow.

DETAILED DESCRIPTION

Figure 1:
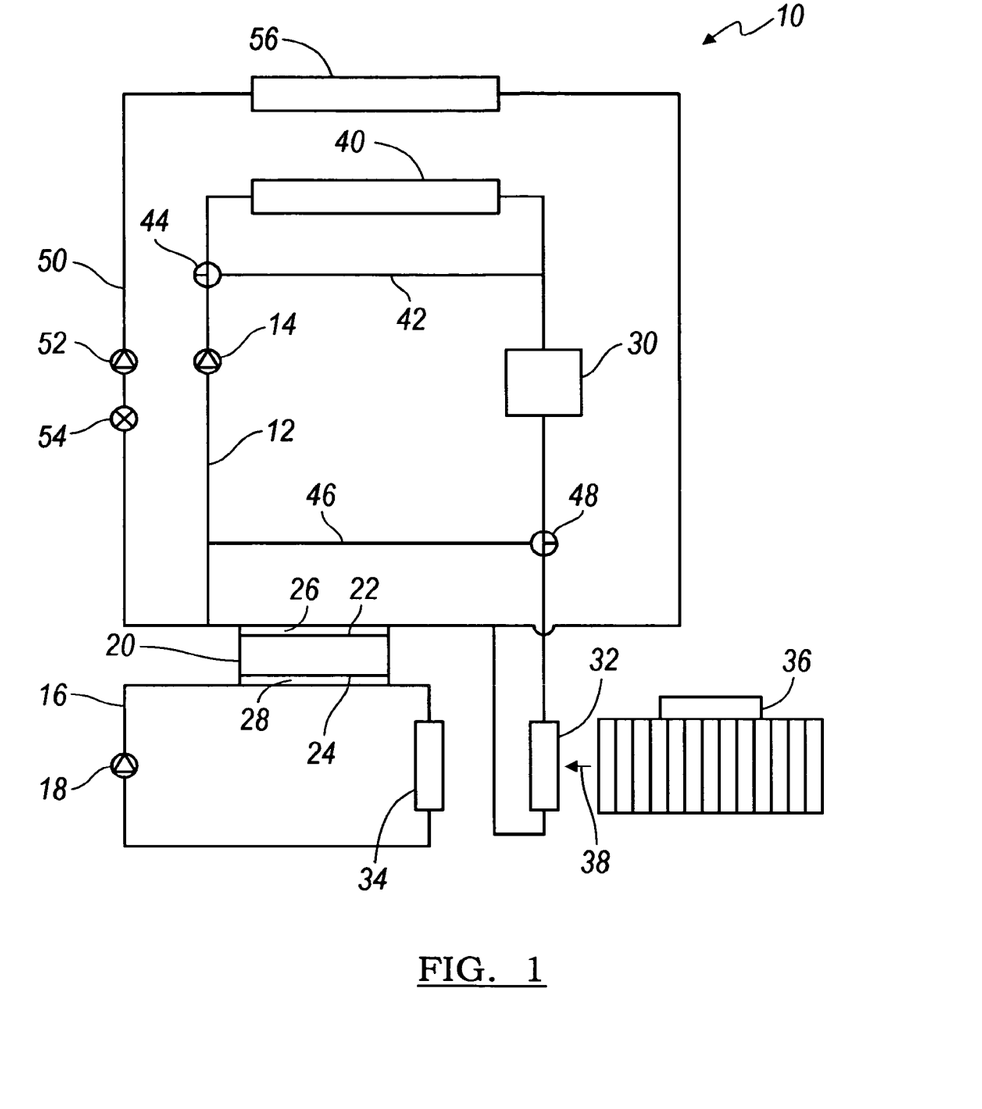
FIG. 1 is a block diagram of an HVAC unit embodying the principles of the present invention.

Referring to FIG. 1, the various components of a HVAC unit 10 are shown. The HVAC unit 10 includes a first circuit 12 having a first pump 14, a second circuit 16 having a second pump 18, and a thermoelectric module 20 having a first surface 22 and a second surface 24 in thermal communication with the first and second circuits 12, 16, respectively. The first pump 14 circulates a first medium through the first circuit, and the second pump 18 circulates a second medium through the second circuit 16.

In the context of this description, the term "pump" is used in its broad sense of its ordinary and customary meaning and further includes any conventional pump, JxB (J Cross B) pump, electrostatic pump, centrifugal pump, positive displacement pump, gear pump, peristaltic pump or any other medium moving device or combination thereof that is known or later developed.

Generally, the first and second mediums are a liquid having a mix of water and glycol. Alternatively, the first and/or second mediums may be a fluid, gas or multipurpose solid-liquid convection medium.

In the context of this description, the term "thermoelectric module" is used in a broad sense of its ordinary and customary meeting, which is (1) conventional thermoelectric modules, such as those produced by Marlow Industries, Inc. of Dallas, Tex., (2) quantum tunneling converters, (3) thermionic modules, (4) magneto caloric modules, (5) elements utilizing one, or any bi-combination of, thermoelectric, magneto caloric, quantum tunneling and thermionic effects, (6) acoustic heating mechanisms, (7) thermoelectric systems described is U.S. Pat. No. 6,539,725 to Bell, (8) any other sold state heat pumping device (9) any combination, array, assembly and other structure of (1) through (8) above.

In thermal communication with a first heat exchanger 26 is the first surface 22 of the thermoelectric module 20. The first heat exchanger 26 is in turn in thermal communication with the first medium of the first circuit 12. In thermal communication with a second heat exchanger 28 is the second surface 24 of the thermoelectric module 20. This second heat exchanger 28 is likewise in thermal communication with the second medium of the second circuit 16.

Preferably, an internal combustion engine 30 is operatively engaged with the first circuit 12 such that the first medium is circulated by the first pump 14 and is used to cool the engine 30. Alternatively, the engine 30 can be any heat generating source that is known or later developed.

Connected to the first circuit 12 is a third heat exchanger 32 and connected to the second circuit 16 is a fourth heat exchanger 34, both of which are used to condition (heat or cool) air to be provided to the passenger compartment. Accordingly, proximate to the third and fourth heat exchangers 32, 34 is a blower 36. As indicated by the arrow 38, the blower 36 moves air through the third heat exchanger 32 and the fourth heat exchanger 34 before moving the air into the passenger compartment of an automobile. The blower 36 may be a conventional blower, fan, electrostatic blower, centrifugal blower or any air moving system that is known or later developed.

Preferably, the first circuit 12 has a fifth heat exchanger 40, generally a radiator, for cooling the first medium within the first circuit 12. Alternatively, the fifth heat exchanger 40 may be a heat sink or any device that absorbs or rejects heat including the traditional radiator, frame or other vehicle parts. A first bypass line 42 and a first double switching valve 44 are connected to the first circuit 12 such that the first double switching valve 44 can selectively direct the first medium through the first bypass line 42 instead of the fifth heat exchanger 40. By circulating the first medium through the first bypass line 42 instead of the fifth heat exchanger 40, the first medium can be heated more quickly by the engine 30 because the fifth heat exchanger 40 will not have an opportunity to cool the first medium. This is beneficial when the first medium is very cold.

In the context of this description, the term "double switching valve" is used in its broad sense of its ordinary and customary meaning and further includes any valve or medium directing device or combination thereof that is known or later developed.

The first circuit 12 may also have a second bypass line 46 and a second double switching valve 48. The second double switching valve 48 can selectively direct the first medium through the second bypass line 46 (during cooling mode operation) instead of through a section of the first circuit 12 that includes the third heat exchanger 32. By circulating the first medium through the second bypass line 46, the first medium will be unable to transfer heat to the third heat exchanger 32, and thus air provided by the blower 36 will not be heated by the third heat exchanger 32. Additionally, the temperature of the first surface 22 of the thermoelectric module 20 will not be affected by the first medium. This can be advantageous when the HVAC unit 10 is cooling the passenger compartment of the automobile.

The HVAC unit 10 operates in either a heating mode or a cooling mode. In the heating mode, the direction of the current flowing through the thermoelectric module 20 will be such that the first surface 22 cools and the second surface 24 warms. The second surface 24 will pass the heat through the second heat exchanger 28 and to the second medium. As the second medium is passed through the fourth heat exchanger 34, the air provided by the blower 36 is heated thereby. This augments any heating of the air by the third heat exchanger 32.

As the engine 30 warms up, it heats the first medium that will be circulated through the third heat exchange 32 and the first heat exchanger 26. The heat of the first medium is passed through the first heat exchanger 26 to first surface 22 of the thermoelectric module 20. By warming the first surface 22 of the thermoelectric module 20, the difference in temperature between the first surface 22 and the second surface 24 will be minimized, allowing the thermoelectric module 20 to operate more efficiently.

In a cooling mode, the direction of the current flowing through the thermoelectric module 20 will be such that the second surface 24 of the thermoelectric module 20 cools and the first surface 22 of the thermoelectric module 20 warms. The second surface 24 will cool the second medium via the second heat exchanger 28 and, as the cooled second medium is passed through the fourth heat exchanger 34, the air, provided by the blower 36, is cooled before entering the passenger compartment.

In this mode, the first medium is directed through the second bypass line 46 by the second double switching valve 48. By utilizing the second bypass line 46, the heated first medium is not directed through the third heat exchanger 32 and subsequently the first heat exchanger 26 and the first surface 22 of the thermoelectric module 20. The temperature of the first surface 22 of the thermoelectric module 20 therefore not heated, remaining closer in temperature to the second surface 24. As stated before, by having a low temperature differential between the first surface 22 and a second surface 24 of the thermoelectric module 20, the thermoelectric module will operate more efficiently. Additionally, because the third heat exchanger 32 will not be heated by the first medium, air passing through the third heat exchanger 32 will not be heated.

Generally, the first circuit 12 will have a branch circuit 50 having its own pump 52, valve 54 and heat exchanger 56. The branch or third circuit 50 is used to supplement the cooling of a portion of the first medium and the first surface 22. For example, when the valve 54 is configured to allow a portion of the first medium to flow through the branch circuit 50, the heat exchanger 56 of the branch circuit will aid in the cooling of the first medium. It is noted that during this such operation, valve 48 will also be directing a portion of the first medium across bypass line 46. When the valve 54 is configured to prevent the first medium from circulating through the branch circuit 50, the heat exchanger 56 will not supplement the cooling of the first medium.

Figure 2:
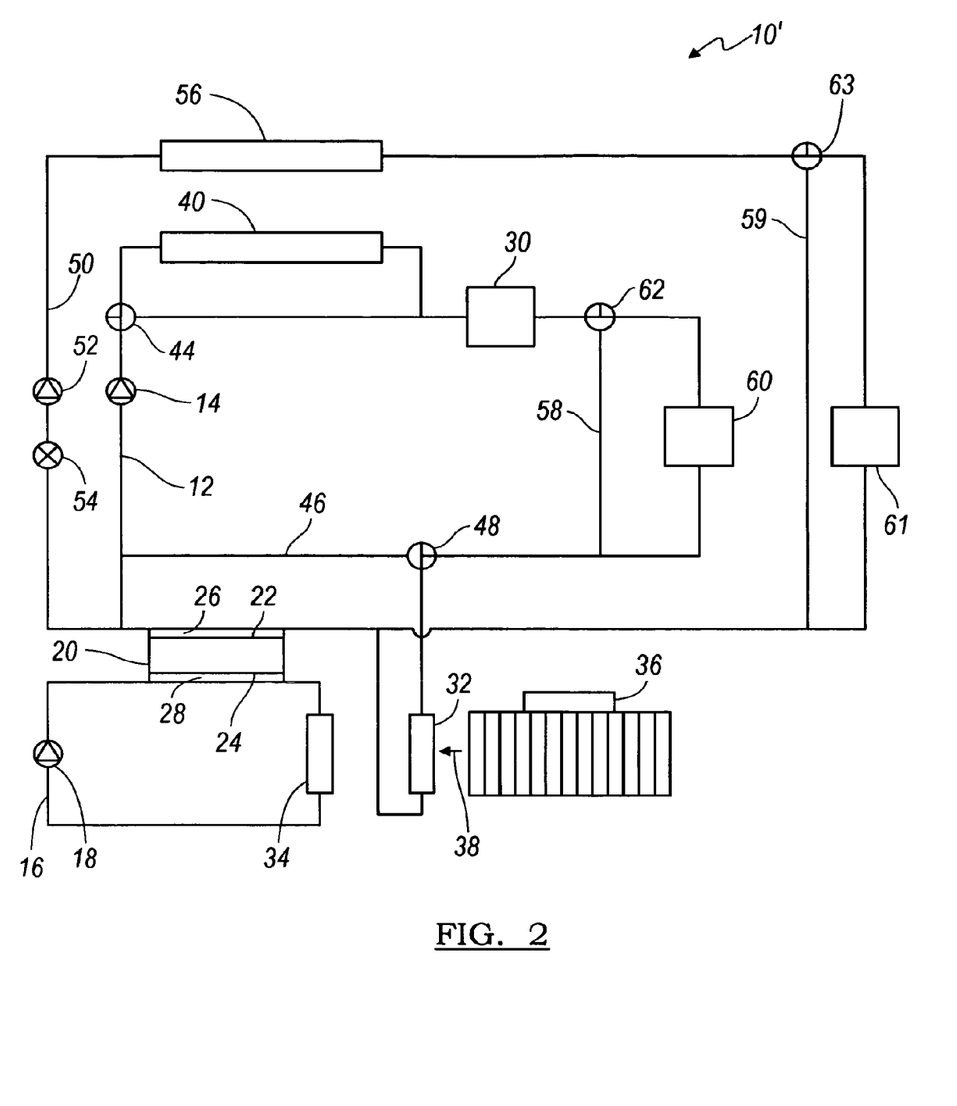
FIG. 2 is a block diagram of a second embodiment of an HVAC unit according to the principles of the present invention and including a supplemental heating source and cooling source.

Referring now to FIG. 2, another HVAC unit 10' is shown. This unit 10' is the same as that discussed previously, except, the first circuit 12 includes a heat generating system 60 located between the engine 30 and valve 48 and the third circuit 50 includes a cold generating system 61 located between the heat exchanger 56 and the first heat exchanger 26. A bypass line 58 and associated double switching valve 62 are also provided so that the first medium may be bypassed around the heat generating system 60, if desired. The heat generating system 60 may be one or more of any system that generates, captures or releases heat, such as a battery, an electronic device, an internal combustion engine, an exhaust of a vehicle, a heat sink, a heat storage system such as a phase change material, a positive temperature coefficient device or any heat generating system that is known or later developed. The third double switching valve 62 will direct the first medium through either the third bypass line 58 or the heat generating system 60. By circulating the first medium through the heat generating system 60, the first medium can be heated more quickly than by the engine 30 alone.

A bypass line 59 and associated double switching valve 63 are also provided so that the first medium may be bypassed around the cold generating system 61, if desired. The cold generating system 61 may be one or more of any system that generates, captures or releases cold, such as a thermoelectric module, a heat sink, a cold storage system such as a phase change material or any cold generating system that is later developed. The double switching valve 63 will direct the first medium through either the bypass line 59 or the cold generating system 61. By circulating the first medium through the cold generating system 61, the first medium can be cooled more quickly than by the heat exchanger 56 alone.

Figure 3:
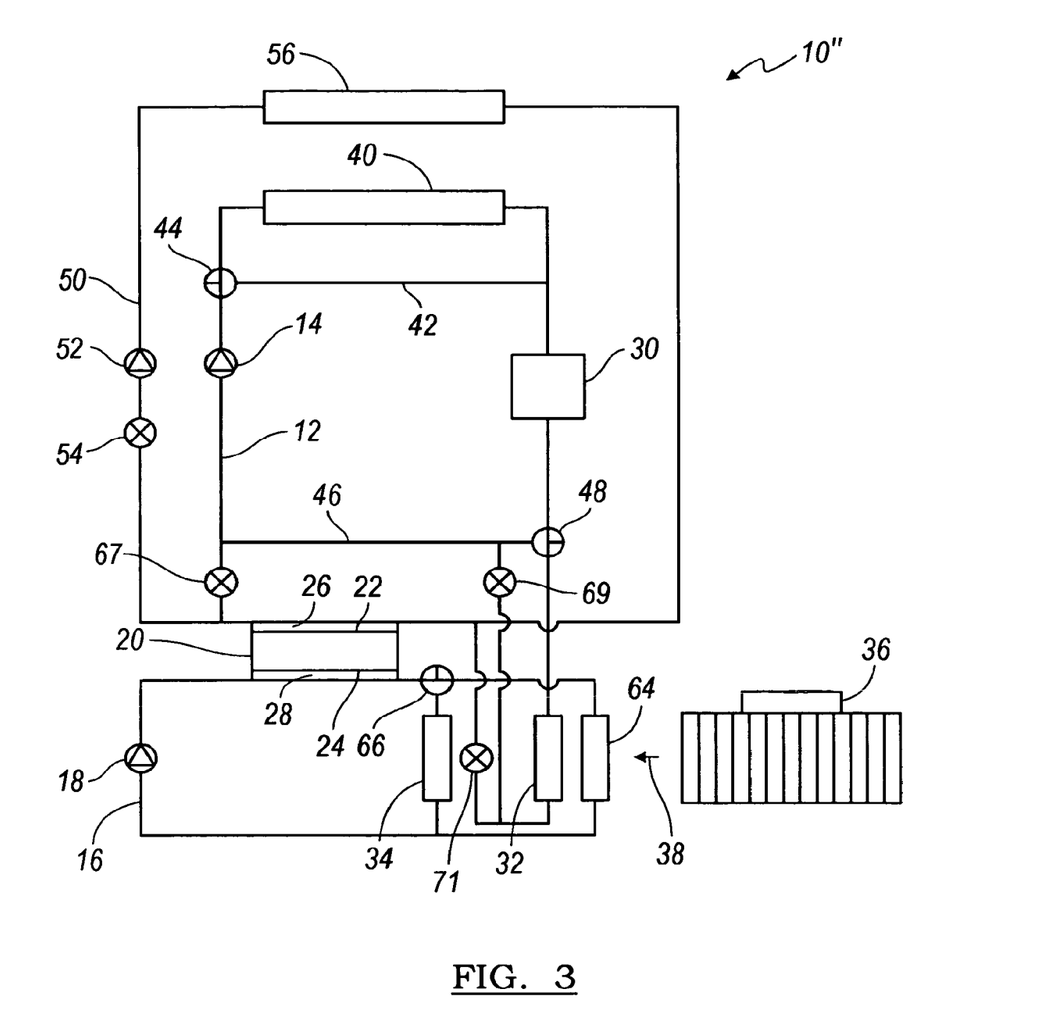
FIG. 3 is a block diagram of a third embodiment of an HVAC unit with according to the principles of the present invention and including a demisting heat exchanger.

Referring now to FIG. 3, another embodiment of a HVAC unit 10" is shown. This unit 10" is substantially the same as that discussed above and shown in FIG. 1. However, a demisting heat exchanger 64 is provided in the second circuit 16 as a bypass, via double switching valve 66, around the fourth heat exchanger. Thus, the demisting double switching valve 66 will selectively direct the second medium through the demisting heat exchanger 64 instead of the fourth heat exchanger 34. As indicated by the arrow 38, the blower 36 will blow air first through the demisting heat exchanger 64. This initial cooling of the air removes moisture from the air via condensation.

After the air is initially cooled, the air may be cooled or heated by the third heat exchanger 32. The valves 67, 69 and 71 will direct the first medium through either first circuit 12, where it is warmed by the engine 30, or through the third circuit 50, where it is cooled by the heat exchanger 56, and then through the third heat exchanger 32. Alternatively, the double switching valve 48 may prevent the first medium from traveling through the third heat exchanger 32, thereby preventing any heating or cooling the air by the third heat exchanger 32.

Figure 4:
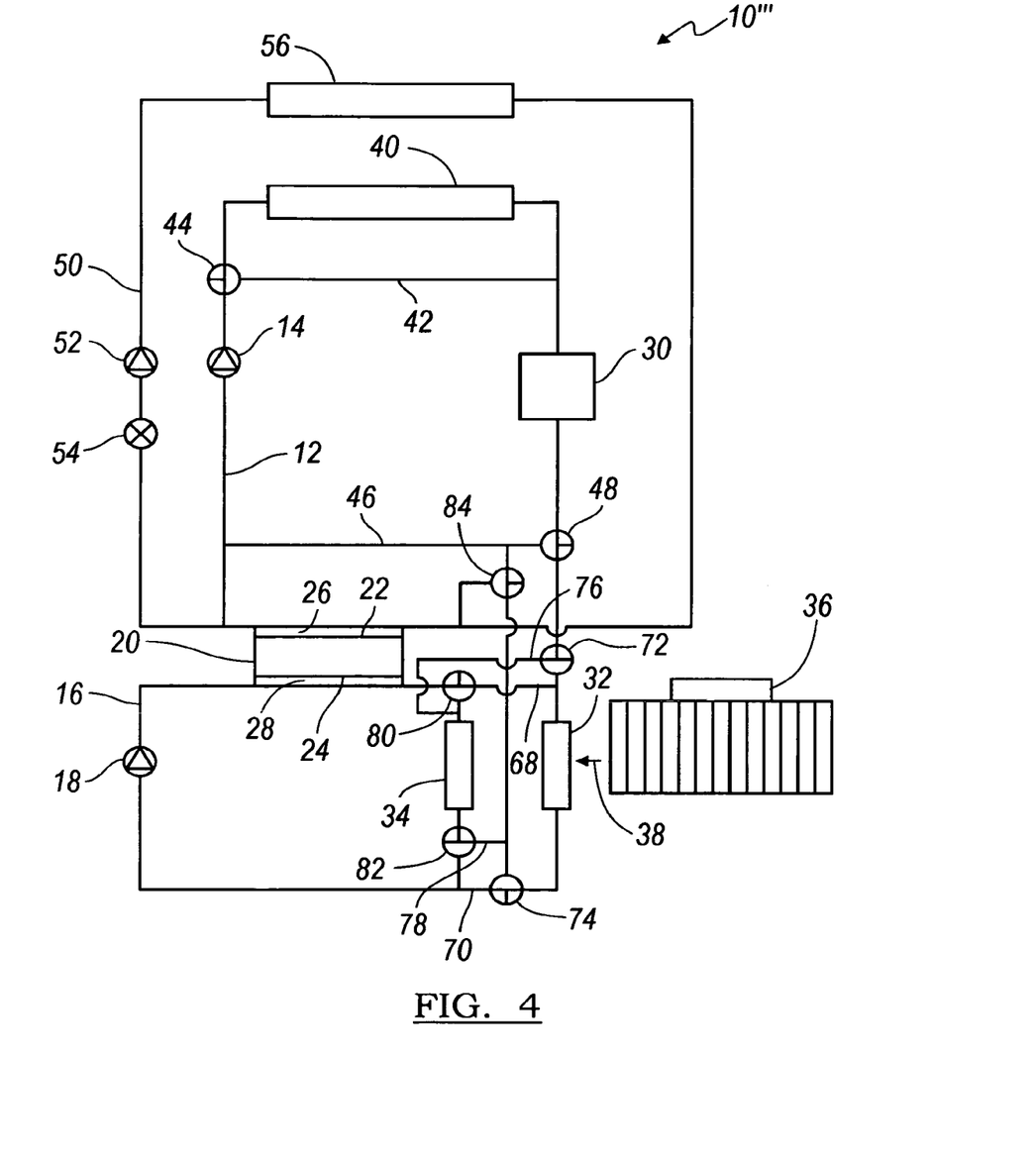
FIG. 4 is a block diagram of a fourth embodiment of the HVAC unit with bypass lines for transferring first and second mediums between a third heat exchanger and a fourth heat exchanger.

Referring now to FIG. 4, another embodiment of the HVAC unit 10''' is shown. The HVAC unit 10''' is substantially the same as the discussed above and shown in FIG. 1. However, a fourth bypass line 68 and a fifth bypass line 70 circulate the second medium to the third heat exchanger 32 and a sixth bypass line 76 and a seventh bypass line 78 circulate the first medium to the fourth heat exchanger 34.

A fourth double switching valve 72 will direct the second medium from the second circuit 16, through the fourth bypass line 68, and to the third heat exchanger 32. A fifth double switching valve 74 will direct the second medium from the third heat exchanger 32, through the fifth bypass line 70, and to the second circuit 16.

A sixth double switching valve 80 will direct the first medium from the first circuit 12, through the sixth bypass line 76, and to the fourth heat exchanger 34. A seventh double switching valve 82 will direct the first medium from the fourth heat exchanger 34, through the seventh bypass line 78, and to the first circuit 12.

By directing the cooler second medium and warmer first medium through the third heat exchanger 32 and the fourth heat exchanger 34 respectively, the third heat exchanger 32 will cool air blown by the blower 36 before the air is heated by the fourth heat exchanger 34. The initial cooling of the air removes moisture from the air via condensation.

Additionally, an eighth double switching valve 84 may be connected to the second bypass line 46 and the first circuit 12. The eighth double switching valve 84 will direct the first medium through either the second bypass line 46 or the first heat exchanger 26. By circulating the first medium through the second bypass line 46, the first heat exchanger 26 will not be in thermal communication with the warmer first medium. This can be advantageous when the HVAC unit 10 is in the cooling mode. The heat contained within the first medium will be unable to transfer heat to the first surface 22 of the thermoelectric module 20. By minimizing the temperature differential between the first surface 22 and the second surface 24 of the thermoelectric module 20, the thermoelectric module 20 will operate more efficiently.

As a person skilled in the art will readily appreciate, the above description is meant as an illustration of implementation of the principles of this invention. This description is not intended to limit the scope or application of this invention in that the invention is susceptible to modification, variation and change, without departing from spirit of this invention, as defined in the following claims.

What is claimed is:

1. A heating, ventilating, and air conditioning system for a vehicle, the system comprising:
   a first circuit configured to circulate a first medium therein, the first circuit in thermal communication with an internal combustion engine of the vehicle;
   a second circuit configured to circulate the first medium therein, the second circuit in thermal communication with a heat generating system of the vehicle, the heat generating system separate from the internal combustion engine;

a heat sink separate from the heat generating system, the heat sink in thermal communication with the first medium;

a thermoelectric module separate from the heat generating system, the thermoelectric module comprising a first heat transfer surface and a second heat transfer surface, the first heat transfer surface in thermal communication with at least one of the first circuit or the second circuit, the second heat transfer surface adapted to be in thermal communication with an air flow; and a first heat exchanger disposed in the air flow and in thermal communication with the first circuit, wherein the first circuit, the second circuit, the thermoelectric module, and the first heat exchanger are configured to heat, cool, or demist the air flow, and wherein the heat generating system comprises at least one of a battery, an electronic device, an exhaust of the vehicle, a heat storage system comprising a phase change material, or a positive temperature coefficient device.

2. The system of claim 1, further comprising a second heat exchanger disposed in the air flow, the second heat exchanger in thermal communication with a third circuit configured to convey a second fluid therein, wherein the second heat transfer surface of the thermoelectric module is in thermal communication with the third circuit.

3. The system of claim 2, wherein the second heat exchanger is disposed in the air flow downstream of the first exchanger with respect to a direction of movement of the air flow.

4. The system of claim 2, further comprising a third heat exchanger disposed in the air flow, the third heat exchanger configured to selectively condition the air flow.

5. The system of claim 1, further comprising a second heat exchanger disposed in the air flow, the second heat exchanger in thermal communication with the second heat transfer surface of the thermoelectric device.

6. The system of claim 1, wherein a source of air is configured to supply the air flow to a passenger compartment of the vehicle.

7. The system of claim 1, wherein the heat sink comprises a second heat exchanger.

8. The system of claim 7, wherein the second heat exchanger comprises a radiator.

9. The system of claim 1, wherein a cold storage system comprises the heat sink.

10. The system of claim 9, wherein the cold storage system comprises at least one of an other thermoelectric module or a cold storage system comprising a phase change material.

11. The system of claim 9, further comprising a third circuit configured to convey the first medium therein, the third circuit in thermal communication with the first heat transfer surface of the thermoelectric device and the cold storage system.

12. The system of claim 1, wherein the first circuit comprises a bypass line configured to direct at least a portion of the first medium through the bypass line away from being in thermal communication with the first heat transfer surface of the thermoelectric module, the at least a portion of the first medium in thermal communication with the internal combustion engine when circulating through the bypass line.

13. The system of claim 1, wherein the second circuit comprises a bypass line configured to direct at least a portion of the first medium through the bypass line away from being in thermal communication with the heat generating system.

14. A system for providing heating or cooling to a vehicle, the system comprising:

a first circuit configured to circulate a first fluid therein;

a second circuit configured to convey the first fluid therein, wherein the second circuit is in thermal communication with a heat source;

a heat sink in thermal communication with the first fluid;

a thermoelectric module having a first heat transfer surface and a second heat transfer surface, the first heat transfer surface in thermal communication with the first circuit;

a first heat exchanger disposed in an air flow and in thermal communication with the first circuit, the first heat exchanger configured to selectively heat the air flow; and a second heat exchanger disposed in the air flow downstream of the first heat exchanger and in thermal communication with the second heat transfer surface of the thermoelectric module, the second heat exchanger configured to selectively heat or cool the air flow, wherein the heat sink comprises a third heat exchanger in thermal communication with the first fluid, and wherein the heat source comprises at least one of a battery, an electronic device, an exhaust of a vehicle, a heat storage system comprising a phase change material, or a positive temperature coefficient device.

15. The system of claim 14, further comprising a third heat exchanger disposed in the air flow the and in thermal communication with a heat source, the third heat exchanger configured to selectively heat the air flow.

16. The system of claim 15, wherein the heat source comprises the first circuit.

17. The system of claim 14, wherein the first circuit is in thermal communication with a heat source.

18. The system of claim 14, wherein the heat source is an internal combustion engine.

19. The system of claim 14, further comprising a second circuit configured to convey a second fluid therein, the second circuit providing the thermal communication between the second heat transfer surface of the thermoelectric module and the second heat exchanger.

20. The system of claim 14, wherein the first circuit, the thermoelectric module, the first heat exchanger, and the second heat exchanger are configured to heat, cool, or demist the air flow.

* * * * *